United States Patent
Ceschini et al.

(10) Patent No.: US 11,131,606 B2
(45) Date of Patent: Sep. 28, 2021

(54) METHOD FOR PROVIDING MEASURED VALUES OF A TECHNICAL INSTALLATION, TECHNICAL SYSTEM, AND METHOD FOR OPERATING THE TECHNICAL SYSTEM

(71) Applicant: Siemens Aktiengesellschaft, Munich (DE)

(72) Inventors: Giuseppe Fabio Ceschini, Florence (IT); Alexey Fishkin, Munich (DE); Thomas Hubauer, Garching bei München (DE); Alin Murarasu, Munich (DE); Mikhail Roshchin, Munich (DE); Nicoló Gatta, Porto Fuori (IT); Mauro Venturini, Rovigo (IT)

(73) Assignee: SIEMENS ENERGY GLOBAL GMBH & CO. KG

( * ) Notice: Subject to any disclaimer, the term of this patent is extended or adjusted under 35 U.S.C. 154(b) by 92 days.

(21) Appl. No.: 16/482,188

(22) PCT Filed: Jan. 30, 2018

(86) PCT No.: PCT/EP2018/052189
§ 371 (c)(1),
(2) Date: Jul. 30, 2019

(87) PCT Pub. No.: WO2018/141702
PCT Pub. Date: Aug. 9, 2018

(65) Prior Publication Data
US 2020/0249126 A1 Aug. 6, 2020

(30) Foreign Application Priority Data

Jan. 31, 2017 (DE) ...................... 10 2017 201 548.9

(51) Int. Cl.
*G01M 15/14* (2006.01)
*G05B 23/02* (2006.01)
*H04Q 9/00* (2006.01)

(52) U.S. Cl.
CPC ......... *G01M 15/14* (2013.01); *G05B 23/0221* (2013.01); *H04Q 9/00* (2013.01); *H04Q 2213/054* (2013.01)

(58) Field of Classification Search
CPC ...... G01M 15/14; G05B 23/0221; H04Q 9/00
See application file for complete search history.

(56) References Cited

U.S. PATENT DOCUMENTS 10,108,783 B2 10/2018 Horseman
2011/0184667 A1 7/2011 Wang et al.
(Continued)

FOREIGN PATENT DOCUMENTS

CN 103499921 A 1/2014
CN 103782300 A 5/2014
(Continued)

OTHER PUBLICATIONS

PCT International Search Report and Written Opinion of International Searching Authority dated Nov. 6, 2018 corresponding to PCT International Application No. PCT /E P201 8/052189 filed Jan. 30, 2018.
(Continued)

*Primary Examiner* — Manuel A Rivera Vargas
(74) *Attorney, Agent, or Firm* — Schmeiser, Olsen & Watts LLP

(57) ABSTRACT

Provided is a method for providing measured values of a technical installation in which measured values in at least one measurement series are captured, wherein a respective measured value is provided by a measurement sensor for a respective physical measurement variable in the technical
(Continued)

installation for a respective measurement time. The measured values are categorized as normal measured values or anomalous measured values with the aid of a threshold value comparison and at least one further method stage. The further method stage comprises calculating one or more statistical position parameters for selected measured values from the same measurement series and/or different measurement series.

The method makes it possible to increase the reliability of the measured values provided.

A technical system comprising the technical installation, at least one measurement sensor and a program-controlled device, and a method for operating the technical system are also proposed.

14 Claims, 8 Drawing Sheets

(56) References Cited

U.S. PATENT DOCUMENTS

| | | |
|---|---|---|
| 2012/0191362 A1 | 7/2012 | Schmitt et al. |
| 2015/0188471 A1 | 7/2015 | Sang-Min |
| 2015/0233730 A1 | 8/2015 | Guillet et al. |
| 2015/0292348 A1 | 10/2015 | Ludovic et al. |
| 2016/0251995 A1 | 9/2016 | Takashi et al. |
| 2017/0017560 A1* | 1/2017 | Takahashi ............ G06F 11/3495 |
| 2017/0082986 A1* | 3/2017 | Tokuhashi ............... H04Q 9/00 |

FOREIGN PATENT DOCUMENTS

| | | |
|---|---|---|
| CN | 104764869 A | 7/2015 |
| CN | 104781508 A | 7/2015 |
| CN | 105718715 A | 6/2016 |
| CN | 105971738 A | 9/2016 |
| CN | 106264475 A | 1/2017 |
| DE | 10141556 A1 | 3/2003 |
| EP | 2290371 A1 | 3/2011 |
| EP | 2351996 A1 | 8/2011 |
| EP | 3061937 A1 | 8/2016 |

OTHER PUBLICATIONS

Buttlers, D T et al; "Automatic real-time fault detection for industrial assets using metasensors".

Li Na: "Research on Wearable Health-Monitoring System based on Human Activity Recognition"; Beijing University of Technology; Doctoral Dissertation; pp. 1-123; 2013.

Miller, Laura C. et al; "A Wrist and Finger Force Sensor Module for Use During Movements of the Upper Limb in Chronic Hemiparetic Stroke"; IEEE Transactions on Biomedical Engineering, vol. 56; No. 9; Sep. 2009.

Li Nanwang; "Study on the detection of water quality anomaly and classification of contaminants based on simple water quality parameters and data mining method"; pp. 1-90; Master's Dissertation; East China Normal University.; 2016.

Chinese Office Action for Application No. 201880021092.8, dated May 7, 2021.

* cited by examiner

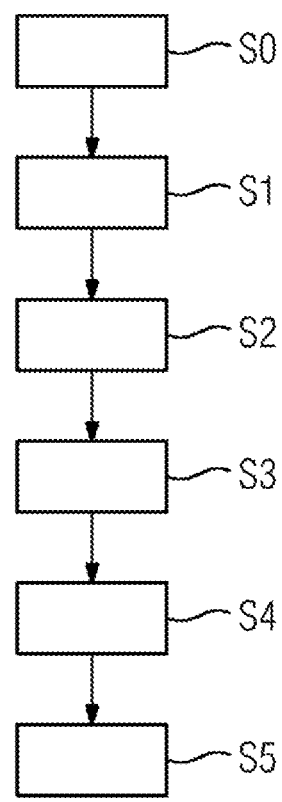
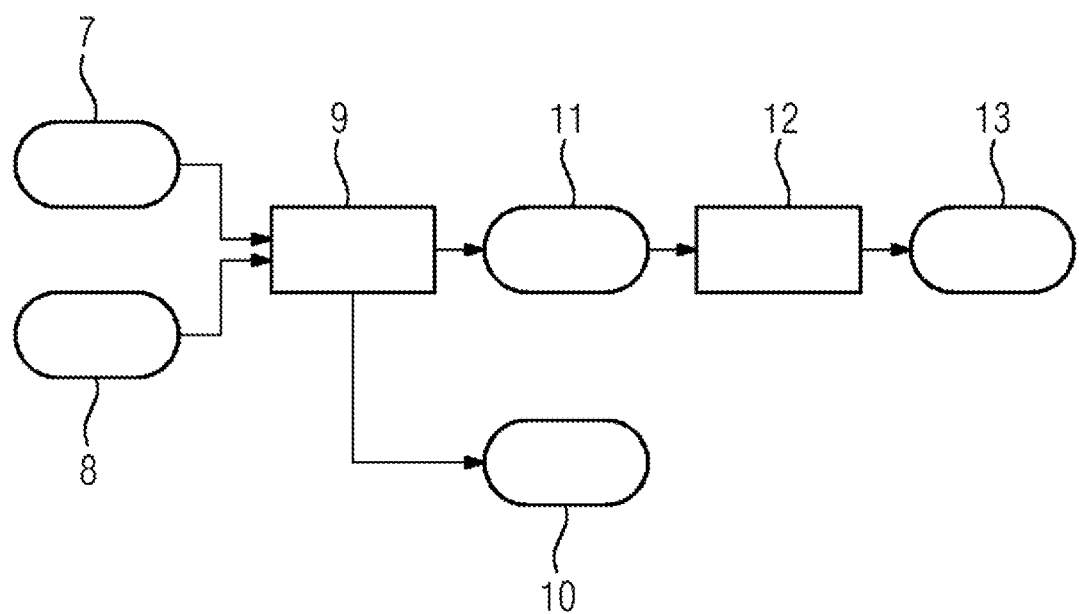

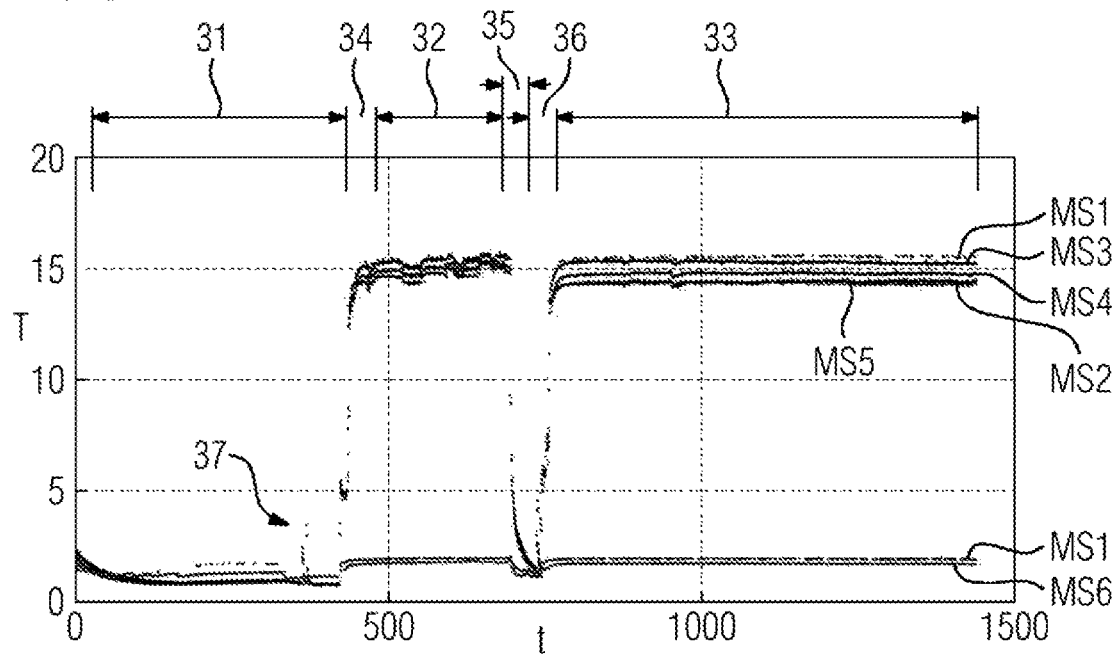
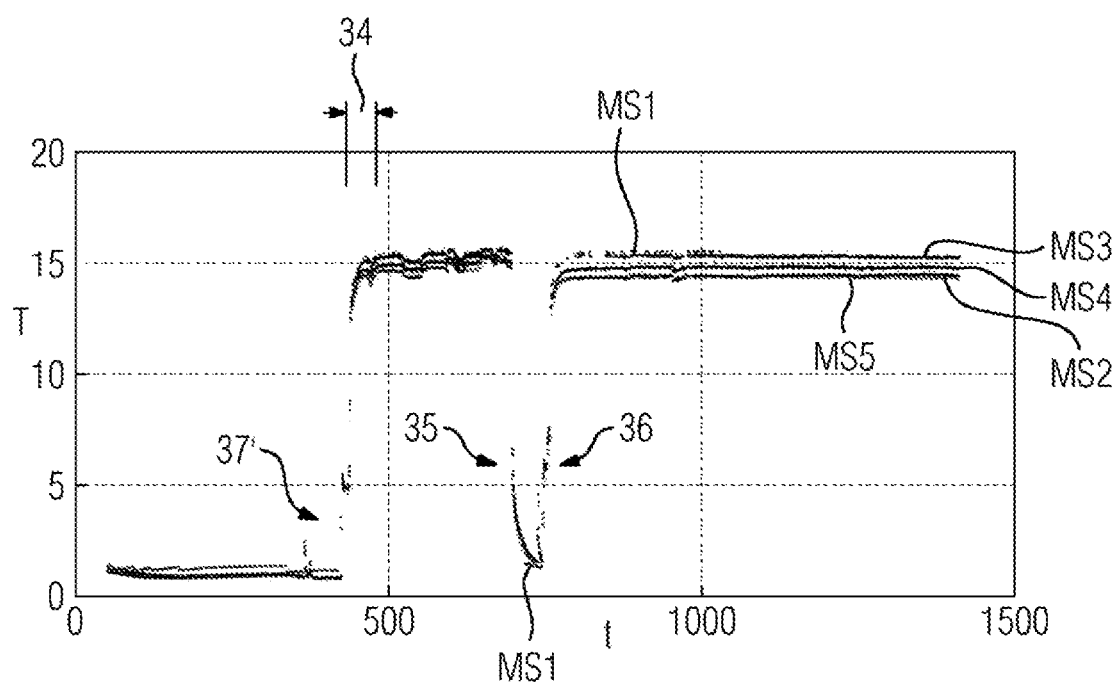

METHOD FOR PROVIDING MEASURED VALUES OF A TECHNICAL INSTALLATION, TECHNICAL SYSTEM, AND METHOD FOR OPERATING THE TECHNICAL SYSTEM

CROSS-REFERENCE TO RELATED APPLICATIONS

This application claims priority to PCT Application No. PCT/EP2018/052189, having a filing date of Jan. 30, 2018 which is based on German Application No. 10 2017 201 548.9, having a filing date of Jan. 31, 2017, the entire contents both of which are hereby incorporated by reference.

FIELD OF TECHNOLOGY

The present embodiments of the invention relate to a method for providing measured values of a technical installation, to a technical system having the technical installation, at least one measurement sensor and a program-controlled device, and to a method for operating a technical system.

BACKGROUND

Technical installations, for example gas or wind turbines in power plants, are becoming increasingly complex. For low-maintenance and efficient operation of such installations, technical systems are therefore used for monitoring and control, in which systems measurement sensors measure measured values of the technical installation, the operating state of the technical system comprising the technical installation and measurement sensors is assessed on the basis of the measured values, and operating parameters of the technical installation are changed depending on this assessment. For example, the optimum time for deactivating the technical installation for maintenance purposes, under cost-benefit aspects, can be determined on the basis of the measured values and the technical installation can be deactivated at the determined optimum time.

The operating state of the technical system can be assessed manually by an operator of the technical installation or automatically in a method carried out by a program-controlled device.

Technical installations, for example gas or wind turbines, can be distinguished by extreme conditions, such as high temperatures, pressures or flow rates, which result in increased error rates of the measurement sensors used. However, measured values which are unreliable, incorrect or anomalous in another manner can reduce the reliability of an assessment of the operating state of the technical installation on the basis of the measured values, which may have a disadvantageous influence on the operation as a result of the operating parameters of the technical installation being changed.

EP 2 290 371 A1 discloses a calibration method for the prospective calibration of measuring equipment. A respective calibration point comprises a measurement signal from the measuring equipment and a reference value corresponding to a reference measurement. A plurality of possible gradients between the measurement points are determined. In order to avoid erroneous calibrations, gradients outside a range predefined by the thresholds can be discarded.

EP 2 351 996 A1 discloses a method for determining at least one characteristic variable for correcting measured values from a Coriolis mass flowmeter. The method comprises capturing values of a measurement variable, calculating at least one position parameter from the captured values, and calculating at least one dispersion parameter from the captured values and the position parameter. Said steps are repeated until the dispersion parameter reaches a threshold value. The measured values are then corrected on the basis of the position parameter corresponding to the dispersion parameter.

SUMMARY

Against this background, the present embodiment of the invention is based on the aspect of proposing a method for providing measured values of a technical installation, which method improves the reliability of the measured values provided by the method.

The aspect is achieved by means of a method according to the independent claims.

In particular, a method for providing measured values of a technical installation is proposed, in which measured values in at least one measurement series are captured, wherein a respective measured value is provided by a measurement sensor for a respective physical measurement variable in a technical installation for a respective measurement time. The measured values are categorized as normal measured values or anomalous measured values with the aid of a threshold value comparison and preferably a further method stage. In this case, the further method stage comprises calculating a plurality of statistical position parameters for selected measured values from one of the at least one measurement series and/or at least one statistical position parameter for selected measured values from a plurality of measurement series.

In the present case, the term "position parameter" denotes a statistical parameter which more accurately describes the position, for example the center, of a distribution comprising a plurality of measured values. It is possible to refer to a "position" with respect to a measured value cloud.

An anomalous measured value, which can also be referred to as an unreliable measured value or outlier, should be understood as meaning, in particular, a measured value which is assumed not to be related to the actual value of the associated physical measurement variable at the measurement time in a manner useful for assessing the operating state of the technical installation on account of a temporary or permanent anomaly, malfunction or a failure of a measurement sensor.

The physical measurement variable may be, for example, a temperature, a movement, a vibration, a pressure or the like.

Each of the measurement series is respectively, for example, a sequence of measured values from a given sensor for a given physical measurement variable, which sequence is preferably arranged according to measurement times. A sequence can also be arranged geometrically on the basis of measurement locations. More than one measurement series can be captured for a given physical measurement variable if redundant sensors are provided. The measurement times can be selected, for example, every hour, every minute or every second. Irregular intervals of time between measurement times are also conceivable.

Obviously incorrect measured values can be categorized as anomalous measured values by means of the threshold value comparison with the aid of the proposed method. Furthermore, measured values which are not obviously incorrect can be categorized as anomalous measured values on the basis of statistical criteria using the position parameter by means of the further method stage.

In one development, the calculation of one or more statistical position parameters for selected measured values from the same measurement series and/or different measurement series comprises calculating a plurality of statistical position parameters for selected measured values from one of the measurement series and/or at least one statistical position parameter for selected measured values from a plurality of measurement series.

Calculating a plurality of position parameters for selected measured values from one of the measurement series advantageously makes it possible to categorize measured values which deviate from the plurality of position parameters on account of temporary sensor anomalies as anomalous, whereas measured values which deviate from only one of the position parameters on account of actual physical transients can be categorized as normal. Calculating a position parameter for selected measured values from a plurality of measurement series makes it possible, if redundant sensors are provided, to categorize individual measured values which deviate from the position parameter on account of a fault in individual sensors of the plurality of redundant sensors as anomalous.

Categorizing the measured values as normal measured values or as anomalous measured values has the effect of increasing the reliability of the measured values. For example, only reliable measured values which are categorized as normal can be advantageously taken into account when assessing the operating state of the technical installation. The operational reliability of the installation is increased since the adjustment of operating parameters is concomitantly determined to a lesser extent by anomalous measured values.

The aspect is also achieved by means of a method for providing measured values of a technical installation, which method comprises carrying out a first method stage and a second and/or third method stage.

The first method stage, the second method stage and the third method stage can be carried out sequentially in any desired order or else can be at least partially carried out in parallel with one another.

The first method stage corresponds to the threshold value comparison described above and below and comprises capturing at least one measured value in the at least one measurement series, comparing the at least one measured value with a predefined threshold value in order to generate a comparison result, and identifying the at least one measured value as a normal measured value or as a first type of anomalous measured value on the basis of the comparison result.

Measured values which are identified as obviously incorrect measured values on the basis of predefined knowledge of the configuration of the technical installation and/or physical circumstances, for instance negative temperatures in liquid water or negative pressures or other gross outliers which deviate greatly from the expected values, can be advantageously identified as a first type of anomalous measured values using the first method stage.

The second method stage corresponds to the further method stage according to the embodiments described above or below and comprises:

capturing a plurality of selected measured values in a plurality of measurement series, wherein the plurality of selected measured values are provided by different measurement sensors for the same measurement variable and for the same measurement time;

calculating a statistical position parameter of the selected measured values; and for at least one of the captured selected measured values: comparing the at least one measured value with the statistical position parameter and, if the at least one measured value deviates from the statistical position parameter by more than a predefined relative deviation or a predefined absolute deviation, identifying the at least one measured value as a second type of anomalous measured value.

In the second method stage, the statistical position parameter can be interpreted as a majority decision by redundant sensors relating to the assumed physically correct measured value. If an individual measured value among the plurality of measured values provided for the same measurement variable and the same measurement time deviates too greatly from the statistical position parameter, the relevant measured value is identified as an anomalous measured value. If a relative deviation is used as a criterion, such a second type of anomalous measured values can be advantageously identified without knowledge of the physical measurement variable.

If an absolute deviation is used, existing knowledge of the physical measurement variable and the expected properties of the associated measurement sensor can be concomitantly included in the identification of a second type of anomalous measured values by suitably selecting the absolute deviation.

The third method stage may be part of the further method stage, as explained above and/or below, and comprises:

capturing a measurement series having measured values, wherein the measured values are provided by a measurement sensor for the same measurement variable and for different measurement times, and the measured values in the measurement series are arranged chronologically; and for at least one of the captured measured values in the measurement series, comprises each of the following steps:

determining a first statistical position parameter and a first statistical dispersion parameter for a first predefined number of measured values in the same measurement series which temporally precede the at least one measured value in the measurement series;

determining a second statistical position parameter and a second statistical dispersion parameter for a second predefined number of measured values in the same measurement series which temporally succeed the at least one measured value in the measurement series;

calculating a first quotient from the absolute value of the difference between the at least one measured value and the first statistical position parameter and the first statistical dispersion parameter;

calculating a second quotient from the absolute value of the difference between the at least one measured value and the second statistical position parameter and the second statistical dispersion parameter;

identifying the at least one measured value as a third type of anomalous measured value if the first quotient is greater than or equal to a predefined first comparison value and the second quotient is greater than or equal to a predefined second comparison value, or as a normal measured value if the first quotient is less than the predefined first comparison value or the second quotient is less than the predefined second comparison value.

In the third method stage, the first quotient describes, for a selected measured value, the ratio of the deviation of the selected measured value from a position parameter of a sliding window of the size of measured values at least partially temporally preceding the selected measured values ("preceding sliding window" below) to a dispersion parameter of the sliding window. The ratio therefore represents a measure of the deviation of the measured value from the position parameter of the distribution, which measure is standardized to the dispersion width of the distribution of the at least partially preceding measured values.

The second quotient describes the ratio of the deviation of the selected measured value from a position parameter of a sliding window of the size of measured values at least partially temporally succeeding the selected measured value ("succeeding sliding window" below) to a dispersion parameter of the sliding window. This ratio therefore represents a measure of the deviation of the measured value from the position parameter of the distribution, which measure is standardized to the dispersion width of the distribution of the at least partially succeeding measured values.

Measured values which deviate too greatly both from the position parameter of the preceding sliding window and from the position parameter of the succeeding sliding window, for example on account of a temporary sensor anomaly, can be identified as a third type of anomalous measured values, without knowledge of the physical measurement variable, by comparing the quotients with predefined dimensionless comparison values, whereas measured values which deviate only from one of the two position parameters and are incorrectly identified as anomalous measured values during conventional smoothing with a centered sliding window on account of a physical transient of the measurement variable can be identified as normal measured values.

The number of measured values in the preceding sliding window is preferably 5 to 200, particularly preferably 10 to 100 and very particularly preferably 30 to 60. The number of measured values in the succeeding sliding window is preferably 5 to 200, particularly preferably 20 to 50 and very particularly preferably 20 to 30.

The first comparison value is preferably greater than two and less than four and is particularly preferably three. The second comparison value is preferably greater than or equal to two and less than four and is particularly preferably three.

The identification of a measured value as a normal measured value or as a second or third type of anomalous measured value according to the second or third method stage is included in the categorization step for a respective measured value and has the effect of increasing the reliability of the provided measured values yet further.

According to another embodiment, the statistical position parameter is a median value, a mean value or a biweight mean value; the first statistical position parameter and the second statistical position parameter are each a mean value, a median value or a biweight mean value; and the first statistical dispersion parameter and the second statistical dispersion parameter are each a standard deviation, an average absolute deviation or a biweight standard deviation.

The statistical position parameter is preferably a median value, the first and second statistical position parameters are preferably each mean values, and the first and second statistical dispersion parameters are preferably standard deviations, and the second comparison value is very particularly preferably two.

In embodiments, the third method stage also comprises identifying a respective measured value in the measurement series as noise if the first quotient is greater than or equal to a predefined third comparison value and the second quotient is greater than or equal to a predefined fourth comparison value. In this case, the predefined third comparison value is less than or equal to the predefined first comparison value and the predefined fourth comparison value is less than or equal to the predefined second comparison value.

The third predefined comparison value and the fourth predefined comparison value are preferably each two.

Noise can be understood as meaning an unreliable measured value, the cause of which is not an anomaly, a malfunction or a failure of the associated measurement sensor, but which deviates excessively from the actual value of the associated physical measurement variable on account of physical interfering influences.

Measured values which are too noisy and are not attributed to a malfunction of the measurement sensor, but are not reliable enough to determine the actual value of the associated physical measurement variable, can be identified as noise, thus further increasing the reliability of the measured values provided.

In further embodiments of the method for providing measured values of a technical installation, the identification of a measured value also comprises changing the measured value provided that the measured value is not identified as a normal measured value.

Suitably changing a measured value which is not normal makes it possible to further improve the reliability of the measured values provided and therefore the reliability of the assessment of the operating state of the technical system.

In embodiments, the changing of a measured value identified as anomalous or as noise comprises providing the measured value with a mark and/or removing the measured value from the measurement series.

If measured values which are identified as anomalous or as noise are provided with a mark or are removed from the measurement series, they can remain disregarded when assessing the operating state of the technical installation, thus improving the reliability of the assessment. If such measured values are removed, the volume of measured value data provided is also reduced, with the result that the computing complexity when evaluating the data and assessing the operating state of the technical installation is reduced.

In embodiments, in the second method stage, if a measured value is identified as a second type of anomalous measured value, the measured value identified as a second type of anomalous measured value is also removed from the plurality of selected measured values, and the steps in the second method stage are repeated for the remaining selected measured values provided that more than two selected measured values remain.

If a measured value is identified as a second type of anomalous measured value in the majority decision according to the second method stage, the statistical position parameter describing the majority decision is recalculated again, with the omission of the measured value identified as anomalous and therefore unreliable, using only the remaining selected measured values. The reliability of the recalculated position parameter is thereby improved. The remaining selected measured values are then compared again with the more reliable, recalculated position parameter, wherein a further anomalous position parameter may possibly be identified. These steps are iteratively repeated until either no more of the remaining measured values are identified as anomalous or only two measured values have remained and a majority decision is no longer possible, and the last remaining measured values are identified as normal measured values.

The identification of a measured value which is identified as an anomalous measured value can also comprise, in embodiments, storing classifying information relating to a degree of severity of an anomaly, a temporal correlation of the anomaly and/or the repeated occurrence of the anomaly in different measurement sensors for the same measurement time.

An anomaly can be understood as meaning, in particular, a circumstance which is the cause of an anomalous measured value. It is therefore possible to determine classifying information which permits conclusions to be drawn on the cause of an anomaly. These conclusions can be made by an operator or an automatic system, for instance an artificial neural network, and can be taken into account when assessing the operating state of the technical system, the technical installation and/or the measurement sensors.

In particular, classifying information relating to a degree of severity of an anomaly can be determined and stored by virtue of the second method stage also comprising:

classifying a measured value identified as a second type of anomalous measured value as a serious anomaly if the measured value classified as a second type of anomalous measured value deviates from the statistical position parameter by more than a second relative or absolute deviation, or as a minor anomaly if the measured value identified as a second type of anomalous measured value deviates from the statistical position parameter by no more than the predefined second range of variation.

In this case, the second deviation is either a predefined second deviation which is greater than the predefined first deviation or a sum of the predefined first deviation and a variable determined from the selected measured values. The second range of variation is preferably the sum of the predefined first range of variation and a quotient of the standard deviation of the selected measured values and the root of the number of selected measured values.

Furthermore, a degree of severity of an anomaly can be determined and stored, in particular, by virtue of the third method stage also comprising:

classifying a measured value identified as a third type of anomalous measured value as a serious anomaly if the first quotient is greater than or equal to a predefined fifth comparison value and the second quotient is greater than or equal to a predefined sixth comparison value, or as a minor anomaly if the first quotient is less than the predefined fifth comparison value or the second quotient is less than the predefined sixth comparison value, wherein the predefined fifth comparison value and the predefined sixth comparison value are each greater than the predefined first comparison value and the predefined second comparison value and are preferably equal to four, for example.

In particular, classifying information relating to a temporal correlation can also be determined and stored, with the result that the method also comprises:

capturing one or more measurement series having measured values, wherein the measured values are provided by one or more measurement sensors for the same measurement variable and for different measurement times and the measured values in the one or more measurement series are each arranged chronologically; and for a respective measured value in one of the measurement series which is identified as a first, second or third type of anomalous measured value, classifying the respective measured value as a temporally correlated anomaly if at least one further measured value for the measurement time preceding or succeeding the measurement time of the respective measured value in the measurement series of the further measured value is likewise identified as the same type of anomalous measured value, or as a temporally isolated anomaly if none of the further measured values for the measurement time preceding or succeeding the measurement time of the respective measured value in the measurement series of the respective further measured value is identified as the same type of anomalous measured value.

In particular, classifying information relating to repeated occurrence of an anomaly in different measurement sensors for the same measurement time can be determined and stored by virtue of the method also comprising:

capturing a plurality of selected measured values which are provided by different measurement sensors for the same measurement variable and the same measurement time;

determining the number of normal measured values and the number of anomalous measured values among the selected measured values; classifying the respective anomalous measured values among the selected measured values as an anomaly of a sensor majority if the number of anomalous measured values among the selected measured values is greater than a predefined maximum value or the number of normal measured values is less than a predefined minimum value, or as an anomaly of a specific sensor if the number of anomalous measured values is not greater than a predefined maximum value or the number of normal measured values is not less than a predefined minimum value.

In the steps mentioned above, the classification may comprise storing classifying information comprising, for each anomaly, information relating to the type of anomaly, a mark for a temporally correlated or a temporally isolated anomaly, a mark for a serious or minor anomaly and/or a mark for an anomaly of a sensor majority or an anomaly of a specific sensor.

The classifying information according to the present embodiment is advantageous, in particular, when determining causes of anomalies of measurement sensors.

The determination and storage of classifying information are included, for example, in the categorization of the measured values.

In embodiments, the following steps are also carried out:

determining the number of measured values provided by a selected measurement sensor and the number of anomalous measured values among the measured values provided by the selected measurement sensor; and deactivating the selected measurement sensor if the proportion of anomalous measured values in the measured values provided by the selected measurement sensor exceeds a predefined acceptance value.

On the one hand, the volume of data to be considered further is reduced and, on the other hand, energy consumption of all of the measurement sensors is reduced by deactivating measurement sensors.

In yet further embodiments, only the further method stages are carried out without carrying out a threshold value comparison beforehand. In this respect, only a statistical consideration is then carried out, in particular with the aid of one or more position and/or dispersion parameters. In this respect, only the first, second or third method stage for categorizing the measured values is carried out in alternative embodiments of the method.

In further embodiments, a technical system having a technical installation, at least one measurement sensor and a program-controlled device is proposed, wherein the program-controlled device is set up to carry out the method for providing measured values which is described above or below. The embodiments and features described for the proposed method accordingly apply to the proposed technical system.

A method for operating a technical system having a technical installation, at least one measurement sensor and a program-controlled device is also proposed, which method comprises carrying out the method according to the embodiment of the method described above or below with measured values from the at least one measurement sensor for at least one physical measurement variable in the technical installation. In this case, an operating parameter of the technical installation is changed or controlled on the basis of the measured values provided by the method for providing reliable measured values.

The changing of the operating parameter of the technical installation may comprise, in particular, deactivating the technical installation for the purpose of carrying out a maintenance operation. Since the deactivation is carried out on the basis of the measured values having improved reliability which are provided by the method, just-in-time maintenance can be advantageously implemented and the maintenance costs can be minimized as a result. In this respect, an operating state of the technical installation is determined on the basis of the measured values provided. It is also possible to create a closed control loop with the aid of the reliably provided measured values for the purpose of operating the installation.

The technical installation of the proposed system may be, in particular, a turbine, a compressor or a generator, in particular a gas turbine or a wind turbine.

The maintenance operation carried out after the deactivation may comprise an off-line washing operation of the guide vanes of a gas turbine. Alternatively, an online washing operation can be initiated on the basis of the measured values provided by the method without deactivating the gas turbine.

The measurement sensor of the proposed technical system may be, in particular, a temperature sensor, a pressure sensor, a motion sensor or a vibration sensor.

A computer program product (non-transitory computer readable storage medium having instructions which when executed by a processor, perform actions) which causes the method according to one of the first to eighth embodiments to be carried out on a program-controlled device is also proposed.

A computer program product, for example a computer program means, may be provided or delivered, for example, as a storage medium, for example a memory card, a USB stick, a CD-ROM, a DVD, or else in the form of a downloadable file from a server in a network. This can be carried out, for example in a wireless communication network, by transmitting a corresponding file containing the computer program product or the computer program means.

Further possible implementations of the embodiments of the invention also comprise not explicitly mentioned combinations of features or embodiments described above or below with regard to the exemplary embodiments. In this case, a person skilled in the art will also add individual aspects as improvements or additions to the respective basic form of the embodiments of the invention.

BRIEF DESCRIPTION

Some of the embodiments will be described in detail, with reference to the following figures, wherein like designations denote like members, wherein:

FIG. 3 shows a schematic flowchart for a method for providing measured values according to a first exemplary embodiment.

FIG. 4 shows a schematic flowchart for the method according to a second exemplary embodiment.

FIG. 8 shows an illustration of raw measurement data in a first situation.

FIG. 9 shows an illustration of reliably provided measurement data.

DETAILED DESCRIPTION

In the figures, identical or functionally identical elements have been provided with the same reference signs unless indicated otherwise.

Figure 1:
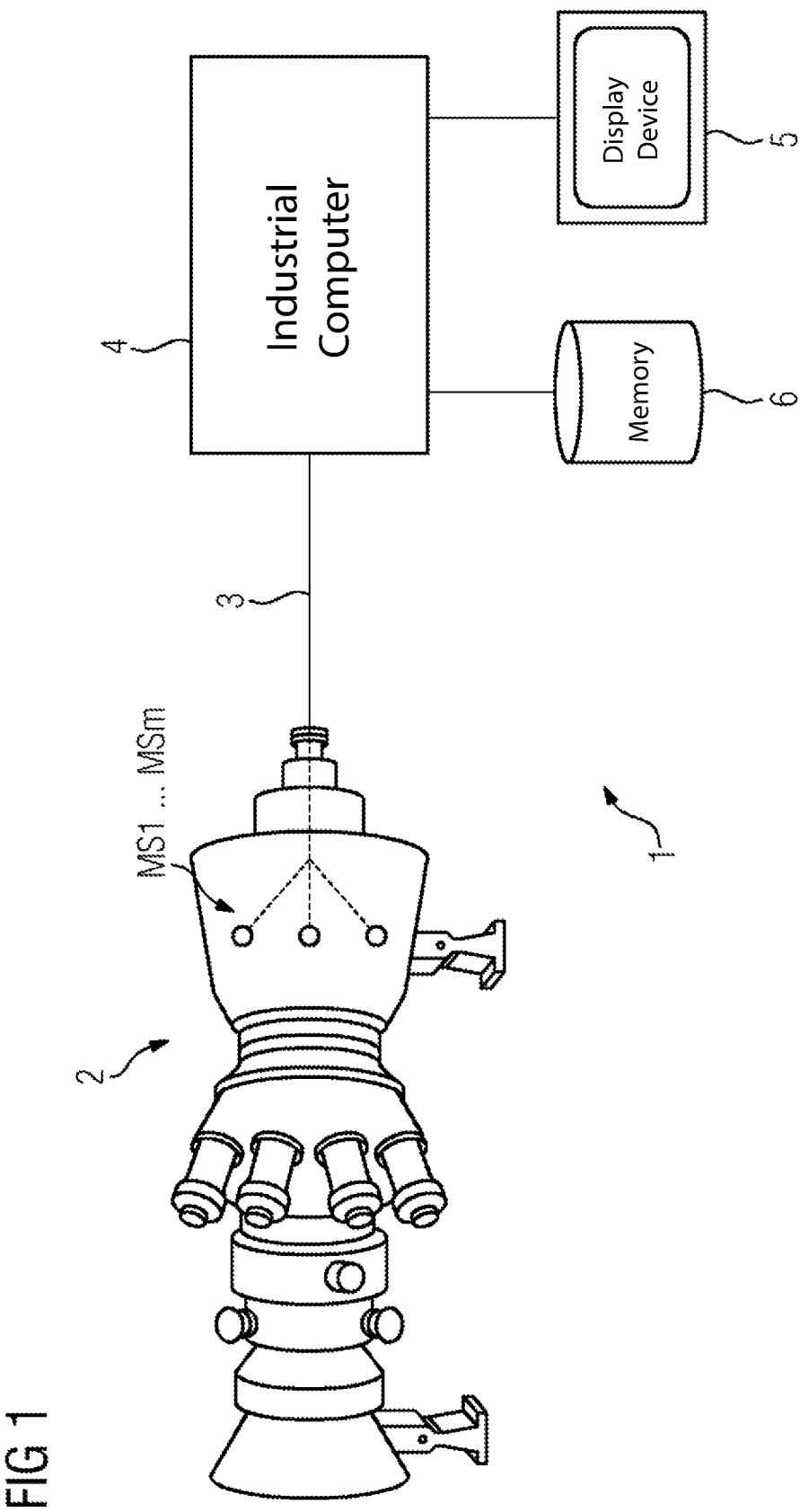
FIG. 1 shows a schematic illustration of a technical system having a technical installation which is set up to carry out a method for providing measured values or measurement data.

FIG. 1 shows a schematic illustration of a technical system 1 according to one embodiment having a technical installation 2, for instance a gas turbine, three measurement sensors MS1-MS3 and a program-controlled device, for instance an industrial computer 4. The measurement sensors MS1-MS3 are arranged inside the gas turbine 2 and are connected to the industrial computer 4 via a wireless or wired connecting section 3 which is routed out of the gas turbine 2. The industrial computer 4 is coupled to a display device 5 and a memory 6.

The measurement sensors MS1-MS3 arranged inside the gas turbine 2 provide the industrial computer 4 with raw measurement data RMD via the connecting section 3.

The industrial computer 4 executes a computer program which causes a method for providing measured values of a technical installation to be carried out using the raw measurement data RMD provided by the temperature sensors.

In one variant, the industrial computer 4 may also be coupled to a control and/or regulating device (not shown) for the gas turbine 1 via a feedback line (not shown). In this variant, the industrial computer 4 also executes a computer program which causes a method for operating the technical system 1 and, in particular, for changing an operating parameter of the gas turbine 2 on the basis of provided reliable measured values to be carried out.

Figure 2:
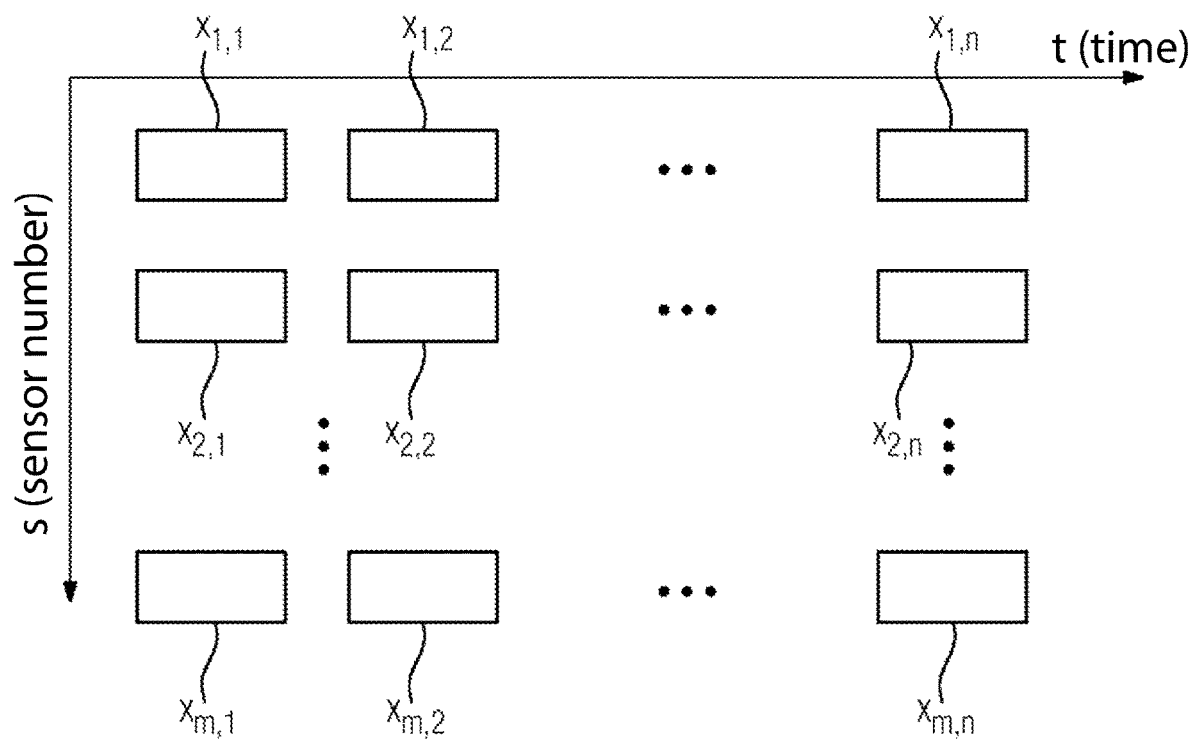
FIG. 2 shows a schematic illustration of possible measurement data.

FIG. 2 shows a schematic illustration for illustrating measurement data which can be captured and provided. In FIG. 2, the time as the number of a respective measurement time is plotted on the horizontal axis and the sensor number is plotted on the vertical axis. Arranged in a vertical direction below one another are m measurement series for m redundant sensors each comprising n measured values x arranged in the horizontal direction for n measurement times for the same physical variable. In the present description, the measurement data are denoted using the equation symbol $x_{s,t}$, where s and t are integers, s=1 . . . m and denotes the number of the respective sensor plotted on the vertical axis in FIG. 2, and t=1 . . . n and denotes the number of the respective measurement time plotted on the horizontal axis in FIG. 2, in which case larger t represent later measurement times and smaller t represent earlier measurement times. In other words, the n measured values $x_{s,t}$ from a measurement sensor MSs with the number s for t=1 . . . n, are arranged in chronological order of the measurement times of the respective measured values from the measurement sensor MSs.

The measurement data in further measurement series can be noted in an identical manner using measured values y, z, . . . for one or more further physical measurement variables and can be schematically illustrated. For easier understanding, only measured values x of the same physical measurement variable are considered in the following description.

The measurement data are held, for example, as a packet data stream, as a vector, as an array, as a concatenated list or the like.

The term "measured value" relates, for example, to a data record comprising at least one numerical measurement data field, for example a floating point value.

In variants, the data record of a measured value may comprise further characterizing information which may comprise numerical data fields, for example an integer value and/or binary values, for example an integer mark which indicates the sensor number of the sensor which has provided the measured value, or a binary mark which indicates whether the measured value is a normal or anomalous measured value, a binary mark which indicates whether an anomalous measured value is a temporally correlated or temporally isolated anomalous measured value, a binary mark which indicates whether an anomalous measured value is a serious or minor anomaly and/or a binary mark which indicates whether an anomalous measured value can be attributed to an anomaly of a sensor majority or an anomaly of a specific sensor. In some embodiments, the data record of a measured value may comprise a pointer which points to a further data record which stores characterizing information as described above.

Exemplary embodiments of a method for providing measured values of a technical installation are described below.

FIG. 3 shows a schematic flowchart of a method according to a first exemplary embodiment. The method comprises six steps S0 to S6 which are carried out in succession.

In step S0, the measurement sensors MS1 . . . MSm in the gas turbine 2, as indicated in FIG. 1, provide raw measurement data RMD. The raw measurement data RMD comprise measured values for physical measurement variables from the respective measurement sensors MS1 . . . MSm.

In step S1, measured values 7, which comprise measured values $x_{s,t}$ for a physical measurement variable x in m measurement series, are captured from the raw measurement data RMD provided.

In step S2, individual measured values $x_{s,t}$ are each compared with a predefined lower threshold value and a predefined upper threshold value. Measured values which are less than the predefined lower threshold value or greater than the predefined upper threshold value are categorized as anomalous. The remaining measured values are categorized as normal.

In step S3, a further method stage comprising the calculation of one or more statistical position parameters is carried out.

In one variant, a statistical position parameter, for instance a median value, is determined in step S3, for example for a selection of measured values from a plurality of measurement series of a plurality of sensors for the same time t. The selected measured values are compared with the median value in succession and are respectively identified as anomalous if they deviate from the median value by more than a predetermined absolute or relative deviation. Otherwise, the respective measured values are identified as normal.

In a further variant, for example for a selected measured value, a preceding window having a first selection of measured values in the same measurement series which correspond to measurement times which temporally precede the selected measured value is formed in step S3, and a succeeding window having a second selection of measured values in the same measurement series which correspond to measurement times which temporally succeed the selected measured value is formed.

A statistical position parameter, for instance a mean value, and a statistical dispersion parameter, for instance a standard deviation, are respectively determined for the preceding window and the succeeding window. For each of the windows, the deviation of the measured value from the respective mean value is standardized using the respective standard deviation and is compared with a respective predefined comparison value. If the standardized deviation both for the preceding window and for the succeeding window is greater than the comparison value predefined for the respective window, the selected measured value is identified as anomalous and is otherwise identified as normal.

In step S4, the captured measurement data are categorized. A measured value is categorized at least on the basis of whether the measured value was identified as normal or anomalous in step S3. In some embodiments, the categorization for measured values identified as anomalous is also carried out on the basis of whether an anomalous measured value is a temporally correlated or a temporally isolated anomalous measured value, whether an anomalous measured value is a serious or minor anomaly and/or whether an anomalous measured value can be attributed to an anomaly of a sensor majority or an anomaly of a specific sensor. The categorization can be carried out by removing measured values identified as anomalous from the captured measured values. Alternatively, the measured values identified as anomalous can remain in the captured measured values and can be provided with a mark which indicates that they are anomalous measured values. The categorization can also comprise storing characterizing information linked to the measured value, which information indicates, for example, whether an anomalous measured value is a serious or minor anomaly and/or whether an anomalous measured value can be attributed to an anomaly of a sensor majority or an anomaly of a specific sensor.

In step S5, the measurement data categorized in step S4 are provided for further use. Optionally, the provided measured values, optionally together with the classifying information, are visualized on the display device 5. Optionally, the provided measured values are stored in the memory 6 and/or are used to change operating parameters of the gas turbine 6. The measurement data which are now reliable are used, for example, to set an operating state of the technical installation 2. In comparison with the raw measurement data RMD, the data provided according to the method allow easier and more reliable operation of the installation.

FIG. 4 shows a schematic flowchart illustrating a second exemplary embodiment of the method for providing measured values.

Measured values 7 captured from the raw measurement data RMD as chronologically arranged measurement series and predefined parameters 8 are input to an anomaly detection unit (ADU) 9. The parameters 8 are, for example, threshold values or details of statistical variables which are to be calculated and can be determined from the measurement data. The ADU 9 categorizes the measured values as normal and anomalous measured values using the predefined parameters 8 and provides normal measured values 10 which can be considered to be reliable and anomalous measured values 11 which can be considered to be unreliable. The anomalous measured values 11 are provided in a manner linked to characterizing information relating to the anomaly. The anomalous measured values 11 are then transferred to an anomaly classification unit (ACU) 12. The ACU 12 carries out a further categorization of the anomalous measured values on the basis of the characterizing information and provides the anomalous measured values in a manner linked to the above-described classifying information as an anomaly classification 13.

Figure 5:
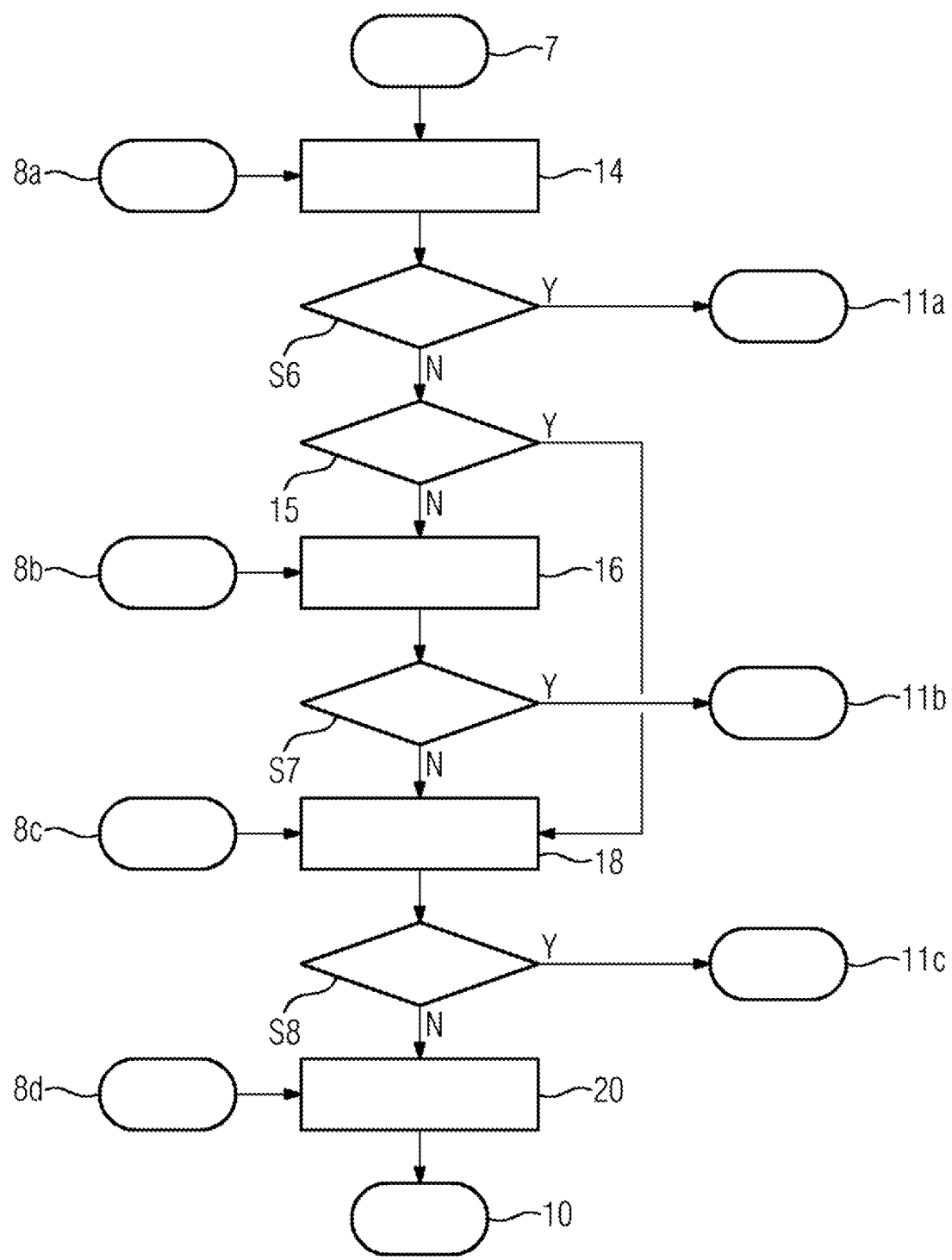
FIG. 5 shows a schematic flowchart for possible first, second and third method stages.
Figure 6:
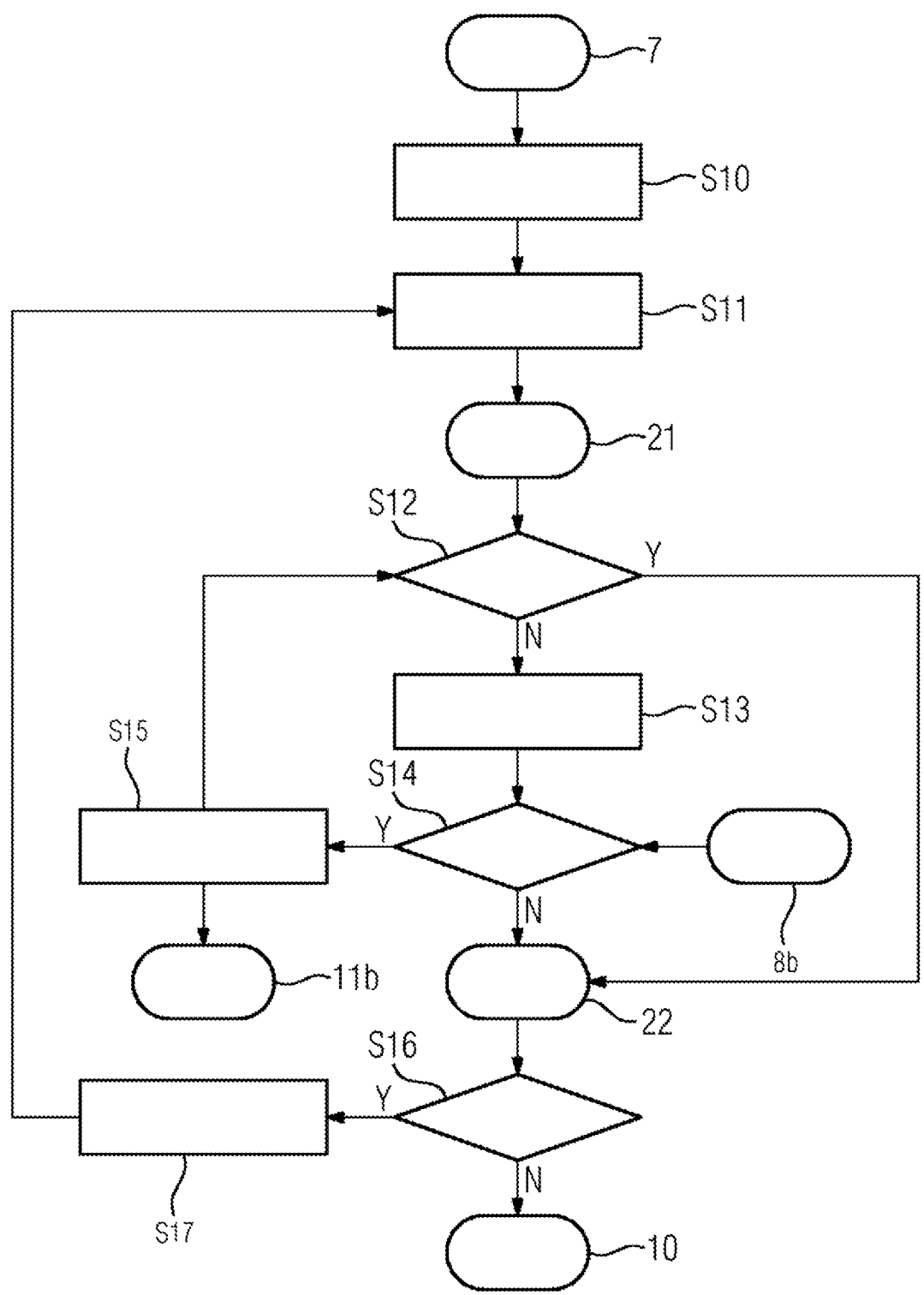
FIG. 6 shows a flowchart of the steps in the second method stage.

The function of the ADU 9 is now explained in more detail on the basis of FIGS. 5 and 6.

FIG. 5 shows a schematic flowchart for a method according to a second exemplary embodiment. Raw measured values 7 captured as chronologically arranged measurement series are made available to the ADU 9. In the ADU 9, the measured values 7 run in succession through a threshold value comparison filter 14, a majority decision-making filter 16, a statistical filter 18 and a noise filter 20. The majority decision-making filter 16 is run through only if the determination 15 previously reveals that there are redundant sensors, that is to say the number m of sensors for the same measurement variable is greater than 1. Predefined parameters 8 (8a, 8b, 8c, 8d) are made available to each of the filters 14, 16, 18, 20.

After each of the filters 14, 16, 18, a determination S6, S7, S8 is carried out for each measured value $x_{s,t}$ of the measured values 7 in order to determine whether the measured value has been identified as an anomalous measured value or as a normal measured value by the respective filter 14, 16, 18. If a measured value has been identified as an anomalous measured value by the respective filter 14, 16, 18, the anomalous measured value is removed from the measured values 7 and is provided as an anomalous measured value 11 (11a, 11b, 11c) in a manner linked to information characterizing the anomaly. In this respect, an item of characterizing information can be assigned to each measured value. The characterizing information contains details such as the value, position, magnitude and number of the anomalous measured values for the same measurement time and details of whether the anomalous measured value has been identified as a first, second or third type of anomalous measured value.

Measured values identified by the noise filter as noise are removed from the measured values 7 and are discarded. After the noise filter, only measured values 7 identified as normal remain in the measured values 7. These are provided as normal measured values 10.

The threshold value comparison filter 14 from FIG. 5 is described in more detail below. Predetermined parameters 8a are made available to the threshold value comparison filter 14. The predetermined parameters 8a comprise a lower threshold value $th_l$ and an upper threshold value $th_u$. In this case, the threshold value comparison filter 14 carries out a first method stage. In the first method stage, the threshold value comparison filter 14 compares each measured value $x_{s,t}$ of the measured values 7 with the lower threshold value $th_l$ and the upper threshold value $th_u$. If one of the conditions from equation 1 below is satisfied, the threshold value is identified as an anomalous measured value.

$$x_{s,t} < th_l \text{ or } x_{s,t} > th_u \qquad \text{(equation 1)}.$$

Measured values which already obviously cannot correspond to reality, when considered in isolation, on account of the knowledge of the technical installation or physical conditions which is expressed in the threshold values are singled out by the first method stage. These anomalous measured values can then remain disregarded, thus increasing the reliability of the assessment of the operating state of the technical installation.

The majority decision-making filter 16 from FIG. 5 is described in more detail below. Predetermined parameters 8b and the measured values 7 are made available to the majority decision-making filter 16. The predetermined parameters 8b comprise a predetermined relative deviation RD and/or a predetermined absolute deviation AD. The majority decision-making filter 16 therefore carries out a second method stage. FIG. 6 shows a flowchart of the steps in the second method stage.

In step S10, a loop covering the n measurement times included in the measured values 7 is initialized by setting a measurement time counter t to 1.

In step S11, the measured values $x_{i,t}$, with i=1 . . . m for the m measurement sensors for the measurement time j, are selected from the measured values 7, and a variable s which indicates the number of the selection 21 of measured values is set to m.

Step S12 determines whether the size s of the selection 21 is less than or equal to two. If s is less than or equal to two, the measured values in the selection 21 are identified as remaining normal measured values 22 and the method is continued in step S16. If s is not less than or equal to two, the method is continued in step S13.

In step S13, a median value $\mu_v(t)$ of the selected measured values for the time t is now calculated. The median value is an example of a statistical position parameter. The choice of the median value as a position parameter is advantageous because the median value has been found to be particularly robust with respect to outliers and anomalous measured values on the basis of studies carried out by the applicant. However, instead of the median value, any other statistical position parameter, for example a mean value or a biweight mean value, can also be calculated for $\mu_v$.

In step S14, a loop covering all measured values in the selection is carried out. A sensor counter i is used to determine, for each i=1 to s, whether the measured value $x_{i,t}$ deviates from the median value $\mu_v$ by more than the predetermined deviation AD or RD. If an absolute deviation AD is predefined, the determination is carried out by evaluating the condition from equation (2) below:

$$|x_{i,t} - \mu_v(t)| > AD \qquad \text{(equation 2)}.$$

If a relative deviation RD is predefined, the determination is carried out by evaluating the condition from equation (3) below:

$$\frac{|x_{i,t} - \mu_v(t)|}{\mu_v(t)} > RD. \qquad \text{(equation 3)}$$

If the condition is not satisfied for any i, that is to say if none of the selected measured values $x_{i,t}$ deviates from the median value $\mu_v$ by more than the predetermined deviation, the selected measured values in the selection 21 are identified as reliable, that is to say normal, measured values 22, and the method is continued with step S16.

If the condition is satisfied for one i, the method is continued with step S15.

In step S15, the measured value $x_{i,t}$ is identified as a second type of anomalous measured value 11b, the measured value $x_{i,t}$ is removed from the selection and the variable s which indicates the size of the selection is reduced by 1. The method is then continued with step S12.

Step S16 determines whether further measurement times are available in the measurement data 7, that is to say whether the condition t<n has been satisfied, where n is the number of measurement times in the measurement data 7. If so, the method is continued with step S17. In step S17, the counter t is incremented by one and the method is continued with step S11.

If no further measurement times are available in step S16, that is to say t>=n, all measured values 22 identified as normal when running through step S12 or S14 are provided as normal measured values 10. The normal measured values 10 can be made available to a further method stage as measured values 7 or can be provided as normal measured values 10 as the output from the ACU. The second method stage ends after step S16.

As described above, measured values from different measurement sensors for the same measurement time are selected in the second method stage of the majority decision-making filter 16 and are categorized as normal or anomalous on the basis of the deviation from a position parameter determined for the selection. This method stage has the advantageous effect that the measured values from individual defective sensors are singled out from a majority of normal sensors and can then remain disregarded, thus increasing the reliability of the assessment of the operating state of the technical installation. The computing and evaluation complexity is also reduced owing to the reduced volume of data.

The statistical filter 18 from FIG. 5 is described in more detail below. Predetermined parameters 8c and the measured values 7 are made available to the statistical filter 18. The predetermined parameters 8c comprise the parameters $w_b$, $k_b$, $w_f$ and $k_f$ which are explained in more detail below. The statistical filter 18 carries out a third method stage.

In the third method stage, the statistical filter 18 captures a measurement series having measured values from the same measurement sensor for the same measurement variable at different measurement times. For the sake of simplicity, the steps which are carried out in the third method stage using the measured values in a captured measurement series for a measurement sensor s are described below, and the notation $x_{s,t}$ which denotes a measured value for the sensor s at the measurement time t is shortened to $x_t$, that is to say the measured value for the measurement time t. It goes without saying that the third method stage can be repeatedly carried out for further measurement series having the measured values from different measurement sensors in each case and of different measurement variables in each case, with the result that the entirety of all measured values 7 can also be captured with the third method stage.

The captured measurement series consists of n measured values for n different measurement times. The steps which are carried out according to the third method stage for a measured value $x_t$ for a selected measurement time t from the n measurement times are described below. It goes without saying that the steps described below according to the third method stage can be carried out in a loop t=1 to n for some or all of the n measured values $x_t$.

Figure 7:
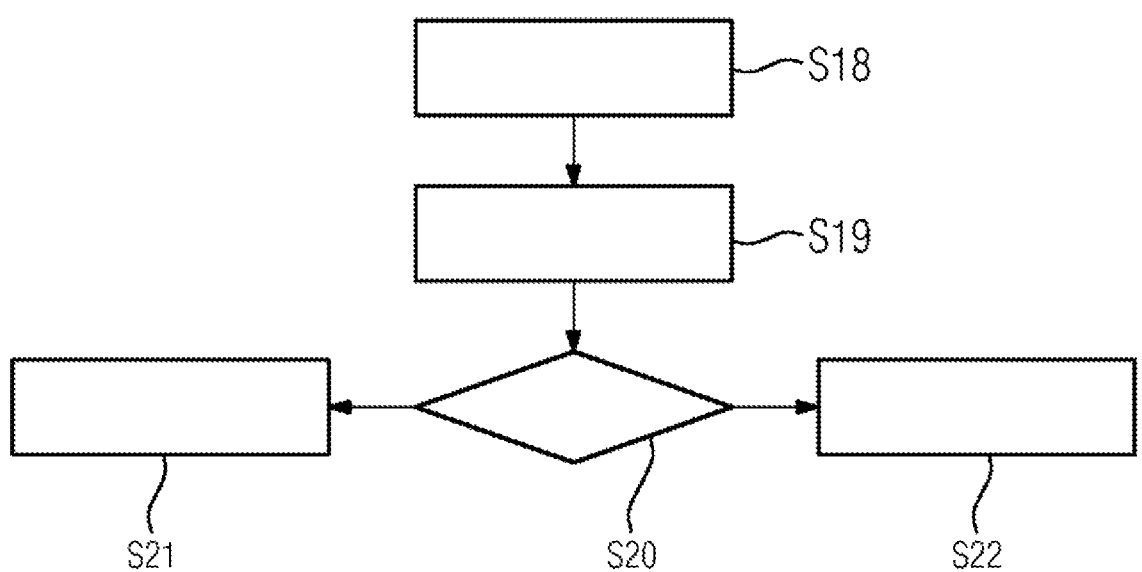
FIG. 7 shows the steps which are carried out according to the third method stage for a measured value.

FIG. 7 shows the steps which are carried out according to the third method stage for a measured value.

In a step S18 according to the third method stage, the measured value $x_t$ is related to statistical position parameters for two so-called windows. According to the present exemplary embodiment, a window denotes a selection of temporally successive measured values. However, the measured values in the window need not necessarily follow one another seamlessly; only every second or every third measured value can also be selected, for example. For the purpose of illustration, a first window, also called preceding window, is a selection of measured values which at least partially temporally precede the measured value $x_t$ in the measurement series, and a second window, also called succeeding window, is a number of measured values which at least partially temporally succeed the measured value $x_t$ in the measurement series. The windows can contain the measured value $x_t$, but the windows preferably do not contain the measured value $x_t$ to be categorized. The size, that is to say the number of measured values in the two windows, is stipulated by the predetermined parameters $w_b$, $w_f$ and can be adapted, for example, to a predefinable operating situation of the technical installation, from which the measured values are retrieved. A preceding window having a number $w_b$ of measured values preceding the measured value $x_t$ and a succeeding window having a number $w_f$ of values succeeding the measured value $x_t$ are selected.

In a step S19 in the third method stage, a statistical position parameter, which denotes the position of a center of the measured values in the window, and a statistical dispersion parameter, which denotes the dispersion width of the measured values in the window, are determined for each of the two windows. Any suitable position parameter and any suitable dispersion parameter can be used for this purpose. According to the second exemplary embodiment, a mean value is determined as a position parameter and a standard deviation is determined as a dispersion parameter, for example. However, in one variant, a median value can also be used as a position parameter and an average absolute deviation can be used as a dispersion parameter. In a further variant, a biweight mean value can be used as a position parameter and a biweight standard deviation can be used as a dispersion parameter. A different position parameter and/or a different dispersion parameter can be determined for the preceding window than for the succeeding window.

In a step S20 in the third method stage, the deviation of the measured value $x_t$ from the mean value is respectively determined for the preceding and succeeding time windows, is standardized with the standard deviation, and the result is compared with a predetermined comparison value k. In other words, the condition from the following equation (4) is evaluated:

$$\frac{|x_t - \bar{x}_b|}{\bar{s}_b} \geq k_b \text{ and } \frac{|x_t - \bar{x}_f|}{\bar{s}_f} \geq k_f \qquad \text{equation (4)}$$

where:
$x_t$: is the measured value for the measurement time t
$\bar{x}_b$: is the mean value of the $w_b$ measured values in the preceding window (position parameter $\sigma_b$)
$\bar{s}_b$: is the standard deviation of the $w_b$ measured values in the preceding window (dispersion parameter $\sigma_b$)
$\bar{x}_f$: is the mean value of the $w_f$ measured values in the succeeding window (position parameter $\mu_f$)
$\bar{s}_f$: is the standard deviation of the $w_f$ measured values in the succeeding window (dispersion parameter $\sigma_f$)
$k_b$: is the predetermined first comparison value
$k_f$: is the predetermined second comparison value.

The parameters $w_b$, $k_b$, $w_f$ and $k_f$ are included in the predetermined parameters 8c made available to the statistical filter 18. According to one variant of the second exemplary embodiment, $w_b$=50, $k_b$=3, $w_f$=25 and $k_f$=2.

If the condition from equation (4) has been satisfied, the measured value $x_t$ is identified as a third type of anomalous measured value in step S21 according to the third method stage. Otherwise, the measured value $x_t$ is identified as a normal measured value in step S22.

After the above-described steps in the third method stage have been carried out for all measurement times in the measurement series and for all measurement series in the measurement data 7, the measured values identified as anomalous in this case are provided as anomalous measured values 11c and the values identified as normal are provided as normal measured values 10. The normal measured values 10 may be made available to a further method stage as measured values 7 or can be provided as normal measured values 10 as the output from the ACU.

As described above, in the third method stage of the statistical filter 18, measured values from the same measurement sensor for different measurement times are examined for anomalies and are categorized as normal or anomalous on the basis of statistical parameters in a preceding and a succeeding window having measured values from the same measurement sensor. This method stage results in individual anomalous measured values being singled out from a majority of normal measured values from the same measurement sensor, so-called outliers, and then remaining disregarded, thus increasing the reliability of the measured values and therefore the assessment of the operating state of the technical installation. In addition to outliers, steep transients of the measured measurement variable can also result in a measured value, such as an outlier, differing greatly from the temporally preceding or the temporally succeeding measured values. Such transience, the capture of which is desired, would likewise be smoothed and singled out by a simple smoothing method. However, since statistical parameters both of a preceding window and of a succeeding window are determined according to the third method stage and are used to identify anomalous measured values using an AND combination, only true outliers are singled out by the third method stage, whereas significantly changed measured values on account of steep transients can be categorized as normal measured values, thus further increasing the reliability of the measured values and therefore the assessment of the operating state of the technical installation. The reliability of the measured values also results in more reliable operation of the respective installation.

The noise filter 20 from FIG. 5 is described in more detail below. Predetermined parameters 8d and the measured values 7 are made available to the noise filter 20. The predetermined parameters 8d comprise the parameters $w_b$, $k_{b,noise}$, $w_f$ and $k_{f,noise}$. The noise filter 20 carries out a fourth method stage. The fourth method stage corresponds to the third method stage of the statistical filter 18. The same steps are therefore not described again. The fourth method stage differs from the third method stage in that the predetermined parameters 8d comprise, instead of the first and second comparison parameters $k_b$, $k_f$, the third and fourth predetermined comparison parameters $k_{b,noise}$, $k_{f,noise}$. These parameters are used in the fourth method stage in the same manner as the comparison parameters $k_b$, $k_f$ in the third method stage. They differ in that at least one of the parameters $k_{b,noise}$, $k_{f,noise}$ is less than the corresponding parameter $k_b$, $k_f$. In this manner, measured values which do not satisfy the criteria for an outlier according to the fourth method stage, but nevertheless deviate to a remarkably great extent from the position parameters of the preceding and succeeding windows, can be identified as noise.

The fourth method stage of the noise filter 20 also differs from the third method stage of the statistical filter 18 in that measured values which are identified as noise are not provided in a linked manner as anomalous measured values 11c, but rather are directly discarded. The cause of measured values which are identified as noise is assumed to be, for example, physical interfering influences which are not due to an anomaly or malfunction of the sensor.

The fourth method stage can be carried out after or before the third method stage, at least partially in parallel with the third method stage or at the same time as the third method stage.

The ACU 12 from FIG. 4 is described in more detail below. The anomalous measured values 11 from the ACU 12 linked to characterizing information are made available to the ACU 12. In addition, even though this is not shown in FIG. 4, the ACU 12 can also access the measured values 10 categorized as normal and the raw measured values 7 in a suitable manner. The ACU 12 can be implemented as a separate unit. The ACU 12 carries out an anomaly classification and provides, for example, measured values 13 which are categorized as anomalous and are linked to characterizing information.

According to the second exemplary embodiment, the ACU 12 assigns a mark to an anomalous measured value $x_{s,t}$, which mark indicates that the anomalous measured value value is a temporally correlated measured value (mark relating to a temporal correlation of the anomaly) if the temporally preceding measured value $x_{s,t-1}$ or the temporally succeeding measured value $x_{s,t+1}$ has likewise been categorized as an anomalous measured value.

According to the second exemplary embodiment, the ACU 12 adds a mark to a second type of anomalous measured value, which mark indicates that the anomalous measured value is a "serious anomaly" (mark relating to a degree of severity of the anomaly) if the anomalous measured value deviates to a particularly great extent from the position parameter $\mu_v$. This is considered to be satisfied if the condition from the following equation (5) or (6) is satisfied for the anomalous measured value $x_{i,t}$ in the second method stage of the ADU 9:

$$|x_{i,t} - \mu_v(t)| > AD + \frac{\sigma_v(t)}{\sqrt{s_t}} \quad \text{(equation 5)}$$

$$\frac{|x_{i,t} - \mu_v(t)|}{\mu_v(t)} > RD + \frac{\frac{\sigma_v(t)}{\sqrt{s_t}}}{\mu_v(t)}, \quad \text{(equation 6)}$$

where $\sigma_v(t)$: is the standard deviation of the measured values identified as normal for the measurement time t, and $s_t$: is the number of measured values identified as normal for the measurement time t.

According to the second exemplary embodiment, the ACU 12 determines, for a third type of anomalous measured value, whether the measured value is a serious anomaly by carrying out the third method stage of the ADU 9 again using a predetermined parameter $k_{b,severe}$ and a predefined parameter $k_{f,severe}$ instead of the predetermined parameters $k_b$, $k_f$, wherein $k_{b,severe} > k_b$ and $k_{f,severe} > k_f$. According to one variant of the second exemplary embodiment, $k_{b,severe} = k_{f,severe} = 4$. If the third type of anomalous measured value is again identified as an anomalous measured value, this means that the third type of anomalous measured value deviates to a particularly great extent from the position parameters of the preceding and succeeding windows, which position parameters are standardized with the dispersion parameters, and the ACU 12 assigns a mark to such a third type of anomalous measured value, which mark indicates that the measured value is a serious anomaly (mark relating to a degree of severity of the anomaly).

According to the second exemplary embodiment, the ACU 12 links a mark to a second or third type of anomalous measured value $x_{s,t}$, which mark indicates that the anomalous measured value can be attributed to an anomaly of a sensor majority (mark relating to repeated occurrence of the anomaly in different measurement sensors for the same measurement time) if fewer than three measured values have been categorized as normal from all of the measured values $x_{i,t}$; i=1 . . . m for the time t.

According to one development of the second exemplary embodiment, the anomaly classification provided by the ACU 12 also comprises a sensor-based quantitative summary. The sensor-based quantitative summary is a multiplicity of counters which indicate, for each of the m measurement sensors MS1 to MSm, how many measured values, or alternatively what percentage of the measured values provided by the measurement sensor, have respectively been categorized as anomalous measured values, as temporally correlated anomalous measured values, as serious anomalous measured values, as anomalous measured values on account of an anomaly of a sensor majority and/or as one or more particular combinations thereof. Such a sensor-based quantitative summary allows a simple graphical visualization of a sensor quality diagram, for example in the form of a bar chart or a pie chart.

According to one development of the second exemplary embodiment, it is also conceivable for the sensor-based quantitative summary to be used in a further method step to identify sensors in which one or more of the counters reach excessively high values as unreliable and to automatically deactivate them. The deactivation can be carried out by disregarding the measured values from the deactivated sensors in the method steps of the second exemplary embodiment or by switching off the relevant sensors. A measurement sensor in which one or more of the counters reaches an excessively high value possibly is not operating correctly, with the result that the measured values from the sensor which are not identified as anomalous may not be reliable either. The reliability of the normal measurement data 10 provided can therefore be further improved by deactivating such sensors and the volume of data to be considered can be reduced. In addition, the energy consumption of all of the measurement sensors is reduced by switching off such sensors.

The ADU 9 and the ACU 12 and the filters 14, 16, 18 and 20 included in the ADU 9 can be implemented by means of a program-controlled device 4 which executes a computer program which causes a method for providing measured values according to the second exemplary embodiment, which implements the functions of the ADU 9 and the ACU 12 and the filters 14, 16, 18 and 20 implemented by the ACU 9, to be carried out.

The effectiveness of the proposed method for providing measured values of a technical installation according to the second exemplary embodiment was investigated by the applicant on the basis of field data obtained from a gas turbine.

In a first application, six thermocouples MS1 . . . MS6 were arranged, as measurement sensors, on the burner tip in a gas turbine 2 and provided measurement series comprising measured values of the temperature $T_{s,t}$ (s: sensor number, t: measurement time) downstream of the burner. Such measured values are provided for the purpose of detecting successful ignition of the gas turbine on the basis of the temperature increase in a method for operating the technical system.

FIG. 8 shows a plot of raw measured values from the six thermocouples MS-MS6 over a period of 1500 minutes. In FIG. 8, the time t in minutes is plotted in the horizontal direction and a dimensionless temperature T is plotted in the vertical direction. The measurement data were provided at intervals of 1 minute. In the figure, three steady states 31, 32, 33 and three steep transients in the regions 34, 35, 36 can be seen in the plots of the measured values from the sensors MS2 to MS5. The measured values from the sensor MS1 change there between correct values (upper dotted part of the plot MS1) and obviously anomalous values (lower part of the plot MS1). The measured values from the sensor MS6 do not follow these transients at all. If a simple mean value were formed from the measured values from the six sensors MS1-MS6, this means value would be considerably distorted by the measured values from the sensors MS1 and MS6. In addition, minor outliers can be seen at t=450 (reference sign 37).

A method according to a second exemplary embodiment of the invention was carried out with the raw measured values illustrated in FIG. 8. The predetermined parameter AD for the majority decision-making filter 16 was selected as AD=35° C. in this case.

FIG. 9 shows a plot of the normal, that is to say reliable, measured values provided by the method. The unreliable measured values from the measurement sensor MS6 were successfully identified by the second method stage and were removed from the normal measured values. Some reliable measured values from the measurement data from the measurement sensor MS1 have been retained at t=800 to 1500. In addition, the outliers 37' were smoothed by the third method stage, that is to say some of the outliers 37 were removed. The transients 34, 35 and 36 were correctly categorized as normal and can therefore still be clearly seen in FIG. 9.

In a second application, thirteen thermocouples MS1-MS13 were installed, as measurement sensors, in the shaped section of the combustion chamber of a gas turbine 2 and provided measurement series comprising measured values of the temperature $T_{s,t}$ (s: sensor number, t: measurement time). Such measured values are used to detect flame ignition in a method for operating the gas turbine.

Figure 10:
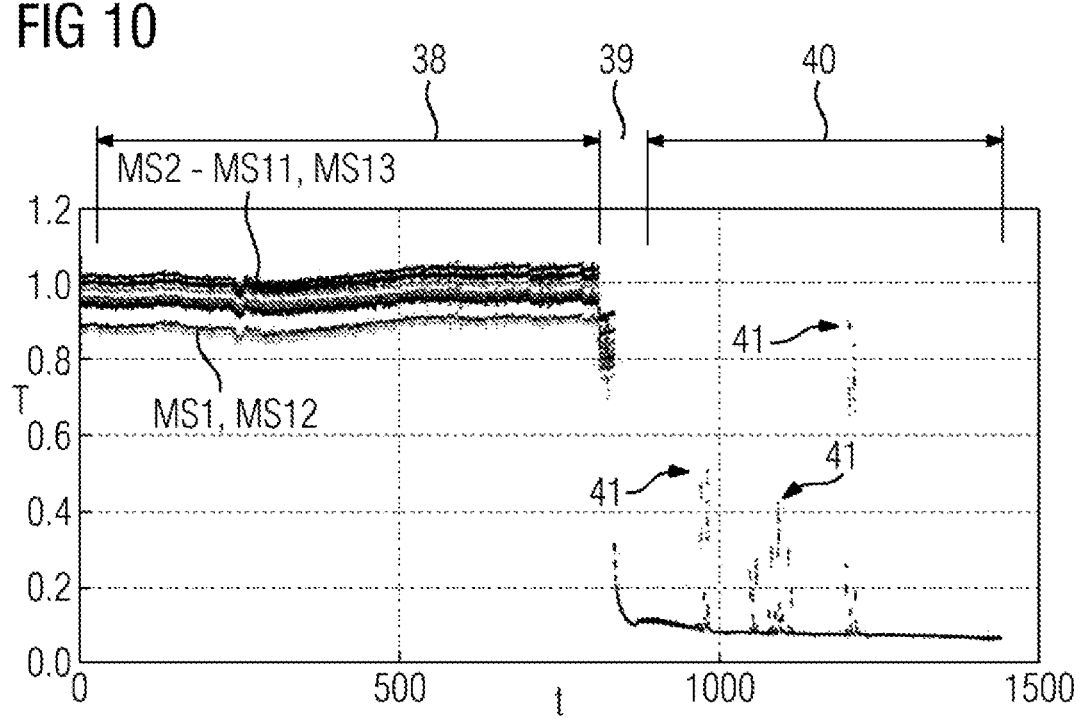
FIG. 10 shows an illustration of raw measurement data in a second situation.

FIG. 10 shows a plot of raw measured values from the thirteen thermocouples MS-MS13 over a period of 1500 minutes. Two steady states 38, 40 and a steep transient 39 can be seen in FIG. 10 in the plots of the measured values from the sensors MS1 to MS13. Outliers can be visually seen in the regions 41. In the region of the steady state 38, the plots of the measured values from the sensors MS1 and MS12 deviate considerably from the plots of the measured values from the other sensors.

A method according to one variant of the second exemplary embodiment of the invention was carried out on the raw measured values illustrated in FIG. 10. The predetermined parameter AD for the majority decision-making filter 16 was selected as AD=35° C. in this case. For the statistical filter 18, a biweight mean value was used as a statistical position parameter $\mu_{f,b}$ and a biweight standard deviation was used as a statistical dispersion parameter $\sigma_{f,b}$. The parameters $k_b$ and $k_f$ were both selected to be equal to $k_b=k_f=3$.

Figure 11:
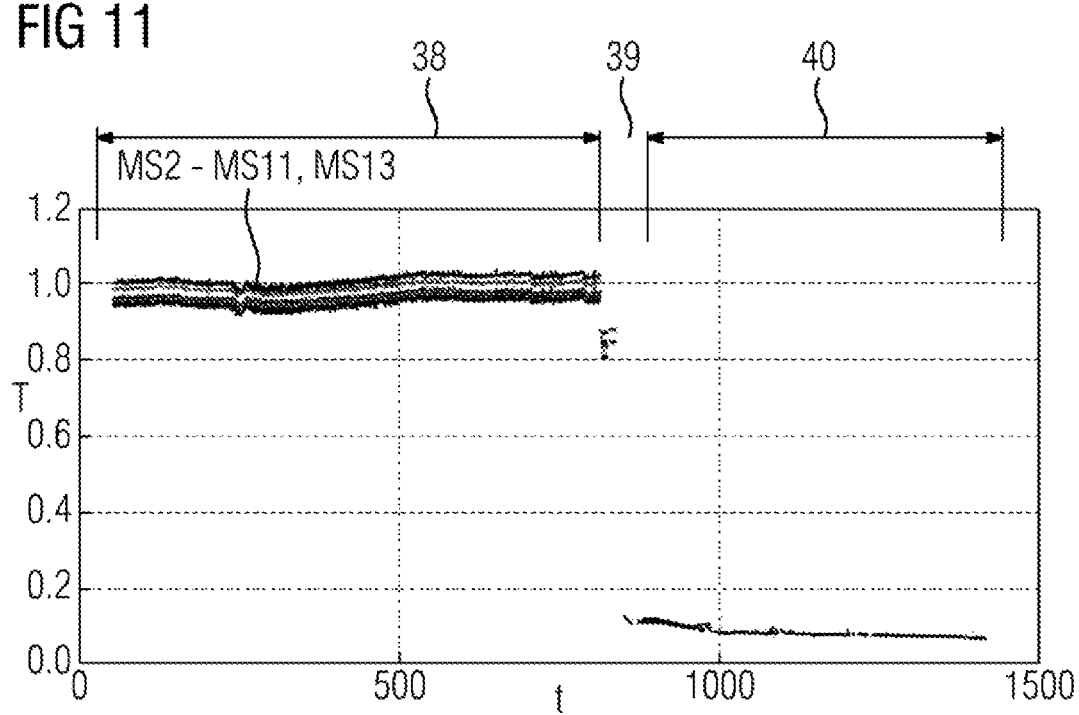
FIG. 11 shows an illustration of reliably provided measurement data in the second situation.

FIG. 11 shows a plot of the normal, that is to say reliable, measured values provided by the method. The unreliable measurement data from the sensors MS1 and MS12 were successfully identified by the second method stage and were removed from the normal measured values. The strong outliers 41 (FIG. 10) were also able to be virtually completely categorized as anomalous by the third method stage and removed. The transient 39 was nevertheless correctly categorized as normal and accordingly can still be clearly seen in FIG. 11. The same applies to the steady regions 38 and 40.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for providing measured values of a technical installation, in which measured values in a plurality of measurement series are captured, wherein a respective measured value is provided by a respective measurement sensor for a respective physical measurement variable in the technical installation for a respective measurement time, and the measured values are categorized as normal measured values or anomalous measured values with the aid of a threshold value comparison and at least one further method stage, comprising:

carrying out the threshold value comparison as a first method stage with the steps of:
capturing at least one measured value in at least one measurement series of the plurality of measurement series,
comparing the at least one measured value with a predefined threshold value in order to generate a comparison result, and
identifying the at least one measured value as a normal measured value or as a first type of anomalous measured value on the basis of the comparison result, and
carrying out the at least one further method stage, the at least one further method stage being at least one of a second method stage and a third method stage,
wherein the second method stage comprises:
capturing a plurality of selected measured values in the plurality of measurement series, wherein the plurality of selected measured values are provided by different measurement sensors for the same measurement variable and for the same measurement time,
calculating a statistical position parameter of the selected measured values,
for at least one of the captured selected measured values:
comparing the at least one captured selected measured value with the statistical position parameter and, if the at least one captured selected measured value deviates from the statistical position parameter by more than a predefined relative or absolute deviation, identifying the at least one captured selected measured value as a second type of anomalous measured value,
wherein the third method stage comprises:
capturing a chronological measurement series having chronological measured values, wherein the chronological measured values are provided by a measurement sensor for the same measurement variable and for different measurement times, and the chronological measured values in the chronological measurement series are arranged chronologically, and
for at least one of the captured chronological measured values in the chronological measurement series:
determining a first statistical position parameter and a first statistical dispersion parameter for a first predefined number of chronological measured values in the same chronological measurement series which temporally precede the at least one chronological measured value in the chronological measurement series,
determining a second statistical position parameter and a second statistical dispersion parameter for a second predefined number of chronological measured values in the same chronological measurement series which temporally succeed the at least one chronological measured value in the chronological measurement series,
calculating a first quotient from the absolute value of the difference between the at least one measured value and the first statistical position parameter and the first statistical dispersion parameter,
calculating a second quotient from the absolute value of the difference between the at least one chronological measured value and the second statistical position parameter and the second statistical dispersion parameter,
identifying the at least one chronological measured value as a third type of anomalous measured value if the first quotient is greater than or equal to a predefined first comparison value and the second quotient is greater than or equal to a predefined second comparison value, or as a normal measured value if the first quotient is less than the predefined first comparison value or the second quotient is less than the predefined second comparison value.

2. The method as claimed in claim 1, wherein
the statistical position parameter is a median value, a mean value or a biweight mean value,
the first statistical position parameter and the second statistical position parameter are each a mean value, a median value or a biweight mean value, and
the first statistical dispersion parameter and the second statistical dispersion parameter are each a standard deviation, an average absolute deviation or a biweight standard deviation.

3. The method as claimed in claim 2, wherein
the third method stage also comprises:
identifying a respective chronological measured value in the chronological measurement series as noise if the first quotient is greater than or equal to a predefined third comparison value and the second quotient is greater than or equal to a predefined fourth comparison value,
wherein the predefined third comparison value is less than or equal to the predefined first comparison value and the predefined fourth comparison value is less than or equal to the predefined second comparison value.

4. The method as claimed in claim 1, wherein
the identification of a measured value also comprises changing the measured value provided that the measured value is not identified as a normal measured value.

5. The method as claimed in claim 4, wherein
the changing of a measured value comprises providing the measured value with a mark and/or removing the measured value from the measurement series.

6. The method as claimed in claim 1, wherein the second method stage also comprises:
if a captured selected measured value is identified as the second type of anomalous measured value:
removing the second type of anomalous measured value from the plurality of selected measured values, and
repeating the steps of the second method stage for the remaining selected measured values provided that more than two selected measured values remain.

7. The method as claimed in claim 1, wherein the identification of a measured value which is identified as an anomalous measured value also comprises storing classifying information relating to a degree of severity of an anomaly, a temporal correlation of the anomaly and/or repeated occurrence of the anomaly in different measurement sensors for the same measurement time.

8. The method as claimed in claim 1, also comprising:
determining the number of measured values provided by a selected measurement sensor and the number of anomalous measured values among the measured values provided by the selected measurement sensor; and
deactivating the selected measurement sensor if the proportion of anomalous measured values in the measured values provided by the selected measurement sensor exceeds a predefined acceptance value.

9. A technical system comprising a technical installation, at least one measurement sensor and a program-controlled device which is set up to carry out the method as claimed in claim 1.

10. The technical system as claimed in claim 9, wherein the technical installation is a gas turbine.

11. The technical system as claimed in claim 9, wherein the measurement sensor is a temperature sensor, a pressure sensor, a motion sensor or a vibration sensor.

12. A method for operating a technical system having a technical installation, at least one measurement sensor and a program-controlled device, comprising:
carrying out the method as claimed in claim 1 with measured values from the at least one measurement sensor for at least one physical measurement variable in the technical installation using the program-controlled device, and
changing an operating parameter of the technical installation on the basis of the measured values provided by the method.

13. The method as claimed in claim 12, wherein the changing of an operating parameter of the technical installation comprises deactivating the technical installation for maintenance purposes.

14. A computer program product, comprising a computer readable hardware storage device having computer readable program code stored therein, said program code executable by a processor of a computer system to cause the method as claimed in claim 1 to be carried out on a program-controlled device.

* * * * *